United States Patent
Leise

(10) Patent No.: US 10,093,206 B2
(45) Date of Patent: Oct. 9, 2018

(54) HEAD RESTRAINT FOR A MOTOR VEHICLE SEAT

(71) Applicant: Dr. Ing. h.c. F. Porsche Aktiengesellschaft, Stuttgart (DE)

(72) Inventor: Jochen Leise, Schoemberg-Bieselsberg (DE)

(73) Assignee: DR. ING. H.C.F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 15/614,866

(22) Filed: Jun. 6, 2017

(65) Prior Publication Data
US 2017/0349070 A1   Dec. 7, 2017

(30) Foreign Application Priority Data

Jun. 7, 2016  (DE) .................. 10 2016 110 496

(51) Int. Cl.
| | | |
|---|---|---|
| *B60N 2/42* | (2006.01) | |
| *B60N 2/427* | (2006.01) | |
| *B60N 2/48* | (2006.01) | |
| *B60N 2/809* | (2018.01) | |
| *B60N 2/865* | (2018.01) | |
| *B60N 2/806* | (2018.01) | |

(52) U.S. Cl.
CPC .......... *B60N 2/4808* (2013.01); *B60N 2/809* (2018.02); *B60N 2/865* (2018.02); *B60N 2/806* (2018.02)

(58) Field of Classification Search
CPC ... B60N 2/4805; B60N 2/4808; B60N 2/4864
USPC .............................................. 297/216.12, 391
See application file for complete search history.

(56) References Cited

U.S. PATENT DOCUMENTS 8,038,219 B2* 10/2011  Boes ...................... B60N 2/888
                                                       297/410
8,205,941 B2*  6/2012  McFalls ................ B60N 2/865
                                                       297/216.12

(Continued)

FOREIGN PATENT DOCUMENTS

DE   10 2008 011 560     4/2009
DE   10 2009 040 069     3/2011

OTHER PUBLICATIONS

German Search Report dated Dec. 21, 2016.

*Primary Examiner* — Rodney B White
(74) *Attorney, Agent, or Firm* — Gerald E. Hespos; Michael J. Porco; Matthew T. Hespos

(57) ABSTRACT

A head restraint (14) has a headrest (16) and at least one guide tube (18) that can be latched to a backrest structure of a motor vehicle seat for movable guidance of the headrest (16) in the direction of travel. An actuating rod (30) is mounted rotatably in the guide tube (18) and an unlocking slide (40) can be moved axially by rotating the actuating rod (30). In an actuating position, the unlocking slide (40) moves a latching element (58) into an unlatched position, and, in a rest position, the latching element (58) occupies a latched position. An actuating bar (24) is guided in the headrest (16) for rotating the actuating rod (30). The guide tube (18) is supported axially without tilting, and protectively accommodates a latching mechanism (59) that is easy to actuate from outside so that the head restraint (14) can be adjusted in a simple manner.

11 Claims, 3 Drawing Sheets

(56) References Cited

U.S. PATENT DOCUMENTS

| | | | |
|---|---|---|---|
| 8,657,378 B2* | 2/2014 | Kunert | B60N 2/815 |
| | | | 297/391 |
| 8,746,800 B2 | 6/2014 | Reel | |
| 8,899,685 B2* | 12/2014 | Haeske | B60N 2/809 |
| | | | 297/410 |
| 8,950,815 B2* | 2/2015 | Wang | B60N 2/4814 |
| | | | 297/410 |
| 9,126,513 B2* | 9/2015 | Jeong | B60N 2/4814 |
| 9,403,458 B2* | 8/2016 | Jeong | B60N 2/4814 |
| 9,649,958 B2* | 5/2017 | Wang | B60N 2/4814 |
| 2003/0057748 A1* | 3/2003 | Schafer | B60N 2/427 |
| | | | 297/216.12 |
| 2003/0227199 A1* | 12/2003 | Yoshizawa | B60N 2/4228 |
| | | | 297/216.12 |
| 2005/0093349 A1* | 5/2005 | Low | B60N 2/841 |
| | | | 297/216.12 |
| 2006/0119150 A1* | 6/2006 | Hoffmann | B60N 2/865 |
| | | | 297/216.12 |
| 2009/0230702 A1 | 9/2009 | Wallinger et al. | |
| 2010/0127541 A1* | 5/2010 | Kotz | B60N 2/865 |
| | | | 297/216.12 |
| 2011/0012399 A1* | 1/2011 | Frose | B60N 2/888 |
| | | | 297/216.12 |
| 2011/0109143 A1* | 5/2011 | Maddelein | B60N 2/865 |
| | | | 297/404 |

* cited by examiner

HEAD RESTRAINT FOR A MOTOR VEHICLE SEAT

CROSS REFERENCE TO RELATED APPLICATION

This application claims priority under 35 USC 119 to German Patent Appl. No. 10 2016 110 496.5 filed on Jun. 7, 2016, the entire disclosure of which is incorporated herein by reference.

BACKGROUND

1. Field of the Invention

The invention relates to a head restraint for a motor vehicle seat, on which an occupant of the motor vehicle can rest their head.

2. Description of the Related Art

U.S. Pat. No. 8,746,800 B2 discloses a motor vehicle head restraint with horizontal struts that can be locked in various positions to vertical struts of a seat so that the head restraint that can be adjusted in the direction of travel. Pins engage in the horizontal struts and in the vertical struts to lock the head restraint. However, a handle can be pulled to move a rod to which the pins are connected. Thus, the pins are moved perpendicular to the direction of travel to such an extent that the pins no longer engage in the horizontal and vertical struts, thereby releasing the locking. A spring can move the rod and hence the pins back into the starting position when the handle is no longer pulled, thereby enabling locking to be re-established.

There is a constant need to be able to adjust a head restraint in a simple manner.

It is the object of the invention to provide a head restraint that can be adjusted in a simple manner.

SUMMARY

A head restraint for a motor vehicle seat has a headrest for resting on a head and at least one guide tube that can be latched to a backrest structure of the motor vehicle seat for movably guiding the headrest in the direction of travel. The guide tube has a rotatably mounted actuating rod and an unlocking slide that can be moved axially between a rest position and an actuating position by rotating the actuating rod in the guide tube. In the actuating position, the unlocking slide moves a latching element into an unlatched position, in which the latching element releases latching of the guide tube to the backrest structure. In the rest position, the latching element occupies a latched position, in which the latching element causes a latching of the guide tube to the backrest structure. An actuating bar is guided in the headrest for rotating the actuating rod.

An occupant of the motor vehicle can move the actuating bar and can introduce a force into the interior of the headrest to rotate the actuating rod in the guide tube. The rotation of the actuating rod can be converted into an axial movement of the unlocking slide. The unlocking slide then acts on the latching element and causes the latching element to cancel the locking of the guide tube. As a result, the vehicle occupant can move the guide tube and the headrest in the direction of travel to set a desired position of the headrest relative to the backrest structure and the remainder of the motor vehicle seat. The vehicle occupant can release the actuating bar once the desired position of the headrest has been reached, thus allowing the previously moved components to reassume their starting position relative to the guide tube. As a result, the latching element can latch the guide tube directly or indirectly to the backrest structure of the backrest of the motor vehicle seat in the newly set position of the headrest. In this arrangement, the actuating rod, the unlocking slide and the latching element can form a latching mechanism that can be accommodated and protected within the guide tube, thus ensuring that these moving components are protected from unnecessary loads and damage. Here, use is made of the insight that a backrest of a motor vehicle seat has a significant thickness in the direction of travel to enable a particularly high level of comfort, and therefore the guide tube has an axial extent that enables moving components to be accommodated in a protected manner. Moreover, the guide tube can move with the headrest and can be guided axially in a tube that is fixed to the backrest structure. As a result, good, substantially tilt-free axial guidance is ensured for the guide tube and there is sufficient installation space within the guide tube for the latching mechanism. The guide tube can be supported axially without tilting and protectively accommodates a latching mechanism that is easy to actuate from outside, thus enabling a simple adjustment of a head restraint.

A plurality of guide tubes can be guided on the backrest structure of the motor vehicle seat, thus making it possible to avoid tilting of the headrest during an adjustment in the direction of travel (X direction). In particular, at least two guide tubes, and, in some embodiments, three, four or more guide tubes may be provided. All or some of the guide tubes can be latched to the backrest structure with the aid of a common actuating bar. For example, the actuating bar can engage simultaneously on two or more guide tubes to rotate respective actuating rods. The actuating rod can be an annular cylinder or on a solid cylinder. Additionally, the actuating rod can have a lateral surface that is largely cylindrical so that the actuating rod can be supported rotatably in the guide tube. The actuating rod may have a projecting spur that is guided in a groove extending at least partially in a circumferential direction. Thus, the actuating rod is mounted in the guide tube in a manner that allows rotation but blocks axial movement. The spur can be inserted in the groove in a manner similar to a bayonet lock guide. For this purpose, the groove can be axially open over a part of the groove extending in an axial direction to enable the spur to be introduced. The maximum adjustment travel of the actuating bar may be short enough to ensure that the spur remains exclusively in the part of the groove extending in a circumferential direction. This avoids a situation where the spur accidentally leaves the groove.

The unlocking slide may rest on the actuating rod via an oblique plane, in particular a plane extending in a circumferential direction and facing in an axial direction. The unlocking slide may be coupled to the guide tube in a manner that prevents relative rotation but allows relative axial movement, such as by a stud guided in a groove. When the actuating rod is rotated, the oblique plane of the actuating rod, which extends in a spiral, for example, can slide along a corresponding oblique plane on the unlocking slide. The axial extent of a ramp system formed by the actuating rod and the unlocking slide thus can be changed. The actuating rod can be guided on the guide tube to be rotatable, but blocked in an axial direction, so that, as the oblique planes slide along, only the unlocking slide is moved in an axial direction when a rotation of the actuating rod relative to the unlocking slide takes place. Here, the unlocking slide is guided to be movable in an axial direction but fixed against relative rotation on the guide tube. As a result, the unlocking slide does not co-rotate during a rotation of the actuating bar. The rotary motion of the actuating bar thus easily can be converted into an axial movement of the unlocking slide to cancel and/or produce latching. By means of the pitch of the oblique planes that slide upon one another, a suitable transmission ratio between the angle of rotation of the actuating rod and the axial movement travel of the unlocking slide can be established.

The latching element may have a latching nose for blocking a movement of the guide tube relative to the latching tube. The latching nose engages in the latched position in the guide tube and in a latching tube that can be connected in a fixed manner to the backrest structure. As a result, the latching nose of the latching element can engage both in the guide tube that is moved with the headrest and in the fixed latching tube and can bring about blocking in an axial direction so that the guide tube is latched to the latching tube. The guide tube may be inserted in the latching tube to enable the latching tube to guide the guide tube without tilting. The guide tube and the latching tube can have apertures into which the latching nose of the latching element can engage in the latched position. The apertures may extend in a circumferential direction A latching tube that can be fixed to the backrest structure to produce latching to the latching element. The guide tube may be guided on the latching tube in a manner that prevents relative rotation but allows relative axial movement. In particular, the guide tube may be inserted into the latching tube. For example, a groove may be provided and may receive a radially extending pin. The pin may be connected to a radially flexible tab, thus allowing the pin to be clipped in a captive manner into a groove delimited in both axial directions. Thus, relative axial mobility is provided for setting a particular relative position of the headrest in the direction of travel, while co-rotation of the guide tube with the actuating rod is blocked. Moreover, the angular position of the guide tube relative to the latching tube remains substantially constant. As a result, the latching element facilitates latching of the guide tube to the latching tube.

The latching element may have a latching spring that is elastic in the radial direction and may have a spring arm coupled to the actuating rod. In the actuating position, the unlocking slide presses the spring arm radially inward elastically, counter to the spring force of the latching element. When the unlocking slide is moved axially during a rotation of the actuating bar, the unlocking slide can press against the spring arm of the latching element and can press the spring arm in axially and/or radially so that latching can be canceled. For example, the spring arm can be pressed radially inward by the unlocking slide, thus allowing a latching-element latching nose inserted in the guide tube and in the latching tube to be moved out of engagement so that the guide tube can move relative to the latching tube in the direction of travel. The spring arm may be bent elastically away from the unlocking slide to provide a spring force of a level so that the spring arm can automatically move into the latched position and, in this case, presses the unlocking slide back towards the actuating rod when a force is no longer being applied by the vehicle occupant. It is thereby possible to dispense with a return mechanism for the unlocking slide, and it can be achieved by the latching element itself.

The unlocking slide may have a contact surface that faces radially inward and can be placed against the spring arm. The contact surface may be oblique to an axial direction and may form a funnel. When the unlocking slide is moved axially during a rotation of the actuating bar, the latching element can slide along the contact surface of the unlocking slide and can be pressed into the interior of the unlocking slide. It is thereby easily possible to reduce an extent of the latching element in a radial direction to move the latching element into the unlatched position and to cancel the latching of the guide tube in the actuating position of the unlocking slide.

The actuating rod may have a retention pin that enters the unlocking slide in an axial direction, and the latching element may be secured by the retention pin, in particular by clipping on. The axial relative position of the latching element is substantially constant by virtue of the coupling to the axially immovable actuating rod, thereby ensuring that the unlocking slide does not merely push the latching element ahead of it during its movement from the rest position into the actuating position. Instead, the unlocking slide can bend the latching element elastically from the latched position into the unlatched position, thereby avoiding jamming or breaking of the latching element.

The actuating bar may have toothing, wherein the toothing that meshes with at least one gearwheel secured for conjoint rotation to the respective actuating rod. Thus, a linear motion of the actuating bar in the headrest in a direction transverse to the direction of travel easily can be converted into a rotation of the gearwheel connected for conjoint rotation to the actuating rod.

The actuating bar may be connected to a button recessed into the headrest. A vehicle occupant can press the button and/or pull on the button to move the actuating bar for actuating the latching mechanism of the head restraint. The button can be integrated into the shape of the headrest so as to be flush with the surface, giving rise to a pleasing appearance for the head restraint and avoiding accidental striking of the button.

The actuating bar may engage on the headrest via a return spring. The vehicle occupant actuates the latching mechanism by moving the actuating bar counter to the spring force of the return spring, thereby preloading the return spring. When the vehicle occupant is no longer exerting force, the actuating bar is moved automatically back into the starting position by the spring force of the preloaded return spring, thereby enabling the latching mechanism to be brought automatically into the latched state in a process in which the actuating rod is rotated back, the unlocking slide moves back into the rest position and the latching element is brought into the latched position.

The invention also relates to a motor vehicle seat for a motor vehicle having a backrest, a backrest structure that reinforces the backrest, and a head restraint that is connected to the backrest structure in a manner that allows adjustment in the direction of travel. The head restraint may be embodied and developed as described above. The guide tube, which can be supported axially in a manner substantially free from tilting, enables a latching mechanism that can be easily actuated from outside to be accommodated in a protected manner, thus making possible an easily adjustable alternative head restraint of the motor vehicle seat. The backrest structure may be formed by interconnected bars that bear the forces that arise while a vehicle occupant is sitting in the motor vehicle seat. The backrest structure can be at least partially surrounded by upholstery.

The invention is explained by way of example below by means of illustrative embodiments with reference to the attached drawings. The features explained below can form one aspect of the invention either individually or in combination.

DETAILED DESCRIPTION

Figure 1:
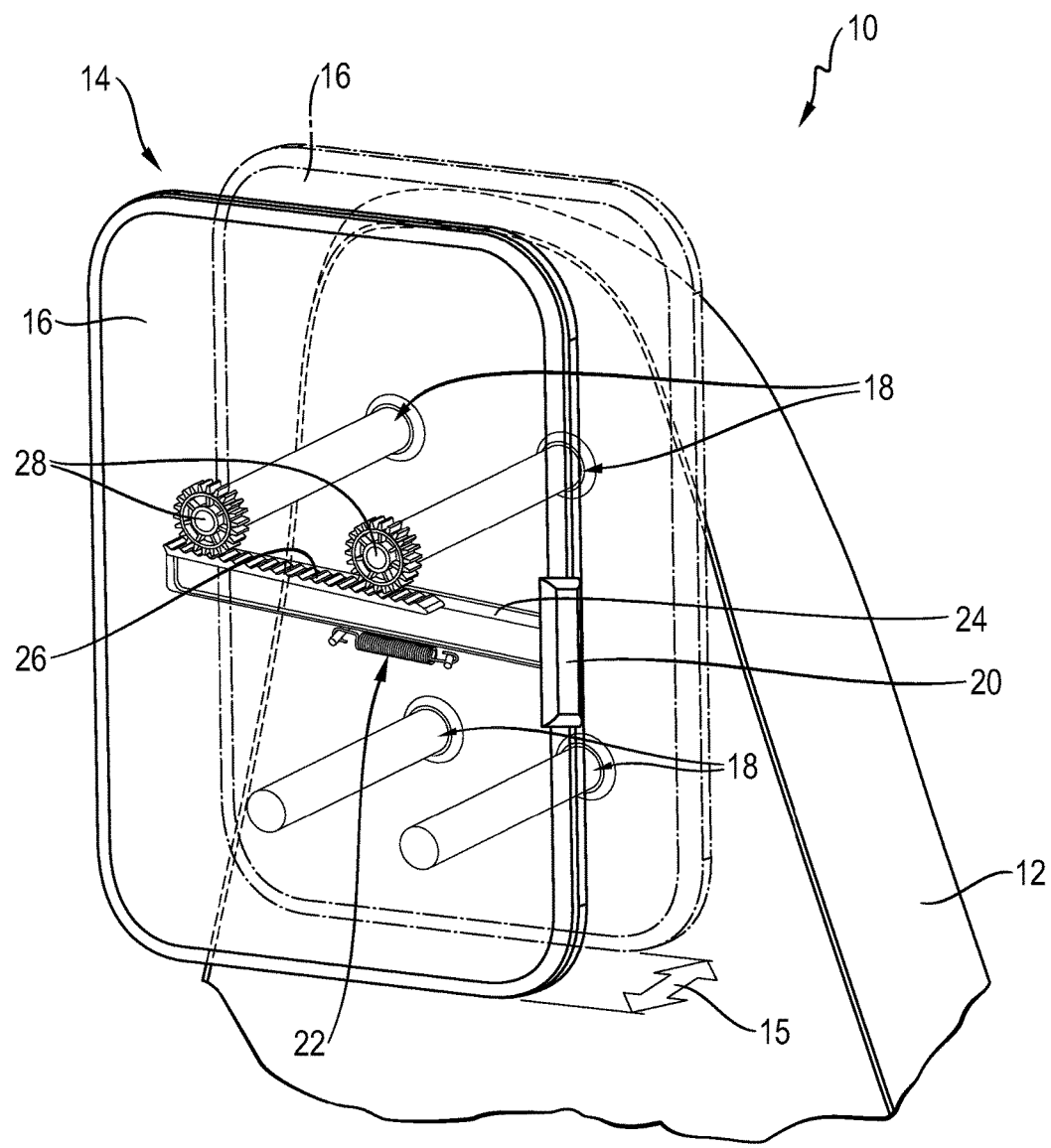
FIG. 1 shows a schematic perspective view of part of a motor vehicle seat.

The motor vehicle seat 10, shown in FIG. 1, for a motor vehicle has a backrest 12 with a reinforcing backrest structure, relative to which a head restraint 14 can be adjusted by an adjustment travel 15 in the direction of travel X. For this purpose, the head restraint 14 has a headrest 16 that is guided movably on the backrest structure by guide tubes 18. A vehicle occupant can press a button 20 partially recessed into the headrest 16 to cancel latching of the headrest 16 to the backrest structure, thereby moving an actuating bar 24 counter to the spring force of a return spring 22 connected to the headrest 16. The actuating bar 24 has toothing 26 that meshes simultaneously with two gearwheels 28 on different guide tubes 18.

Figure 2:
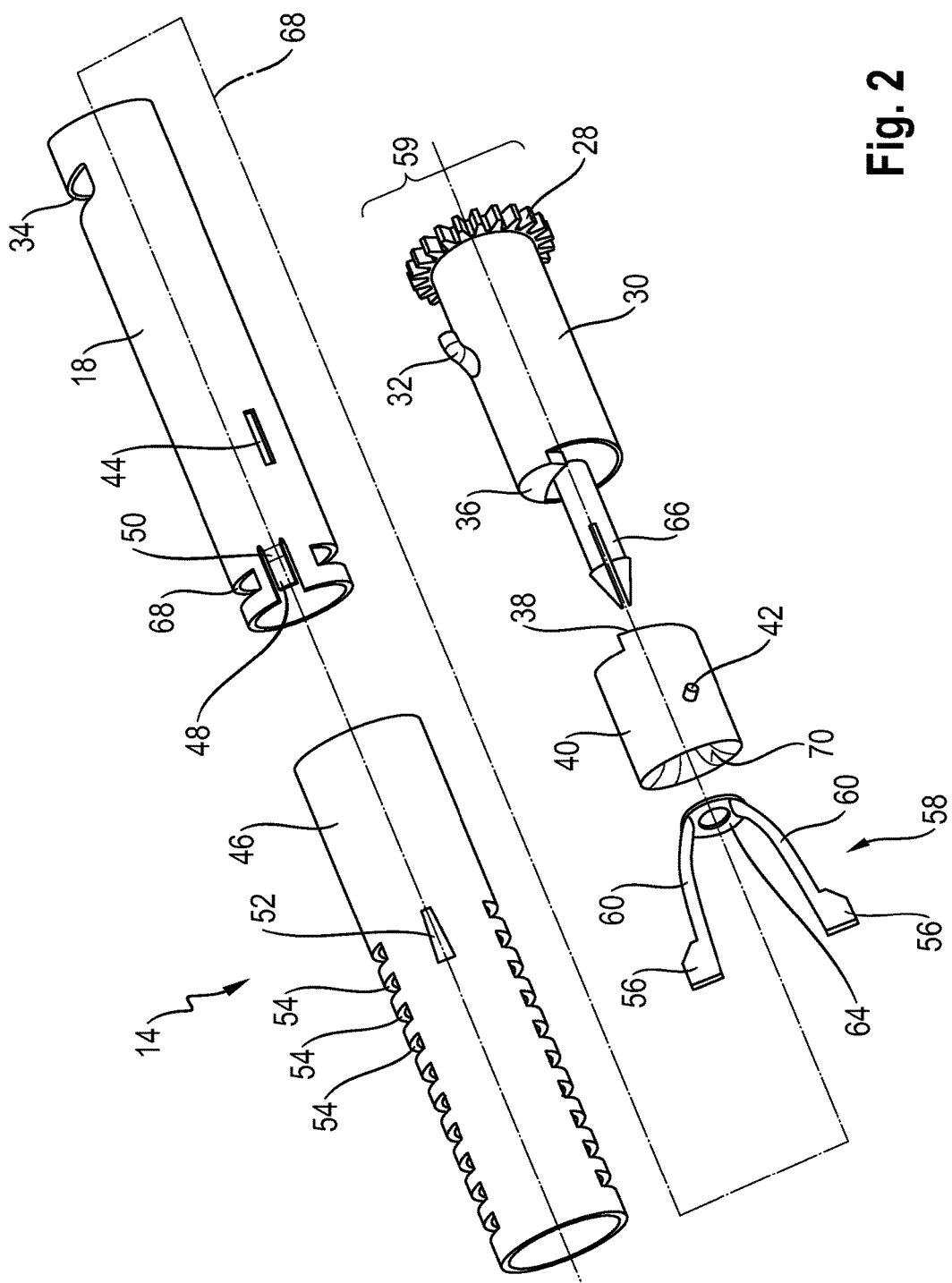
FIG. 2 shows a schematic exploded view of part of a head restraint of the motor vehicle seat from FIG. 1.

As illustrated in FIG. 2, the respective gearwheel 28 is fixed to an actuating rod 30 that is mounted rotatably in the guide tube 18. The actuating rod 30 has a spur 32 that projects radially out and is guided rotatably in a circumferentially extending first groove 34 in the guide tube 18, but is blocked in an axial direction. The end of the actuating rod 30 remote from the gearwheel 28 has an oblique plane 36 that extends in a spiral, faces in an axial direction and can slide along a corresponding oblique plane 38 on an unlocking slide 40. The unlocking slide 40 is guided to be axially movable but fixed against relative rotation in an axially extending second groove 44 in the guide tube 18 by means of a stud 42 projecting in a radial direction. The stud 42 can be radially inwardly flexible, thus allowing the unlocking slide 40 to be clipped into the guide tube 18.

The guide tube 18 is inserted into a latching tube 46 fixed to the backrest structure and is guided in an axial direction in a manner substantially free from tilting. The guide tube 18 has a pin 48 that projects radially out and is flexible in a radial direction by means of a projecting tab 50. The pin 48 can be clipped into a third groove 52 in the latching tube 46 to be axially movable but fixed against relative rotation. The latching tube 46 has plural latching grooves 54 that extend in a circumferential direction and into which a latching nose 56 of a latching element 58 can engage depending on the axial position of the guide tube 18 relative to the latching tube 46. The actuating rod 30, the unlocking slide 40 and the latching element 58 form a latching mechanism 59 that is protected in the guide tube 18 and can latch the guide tube 18 to the latching tube 46.

The latching element 58 has at least one spring arm 60 that can be clipped to a retention pin 66 of the actuating rod 30 via a fastening opening 62. The spring arm 60 is connected radially on the inside to the fastening opening 62 and radially on the outside to the latching nose 56. The spring arm 60 extends at least in part obliquely to a center line 68, with a component in a radial direction and a component in an axial direction. When the actuating rod 30 is rotated by the actuating bar 24 and the unlocking slide 40 is moved axially by the oblique planes 36, 38 sliding one upon the other, a substantially funnel-shaped contact surface 70 can strike against the at least one spring arm 60, preferably at least one pair of spring arms 60 situated opposite one another in a radial direction, and can bend the spring arm 60 elastically radially inwards, thereby cancelling latching of the guide tube 18 to the latching tube 46.

Figure 3:
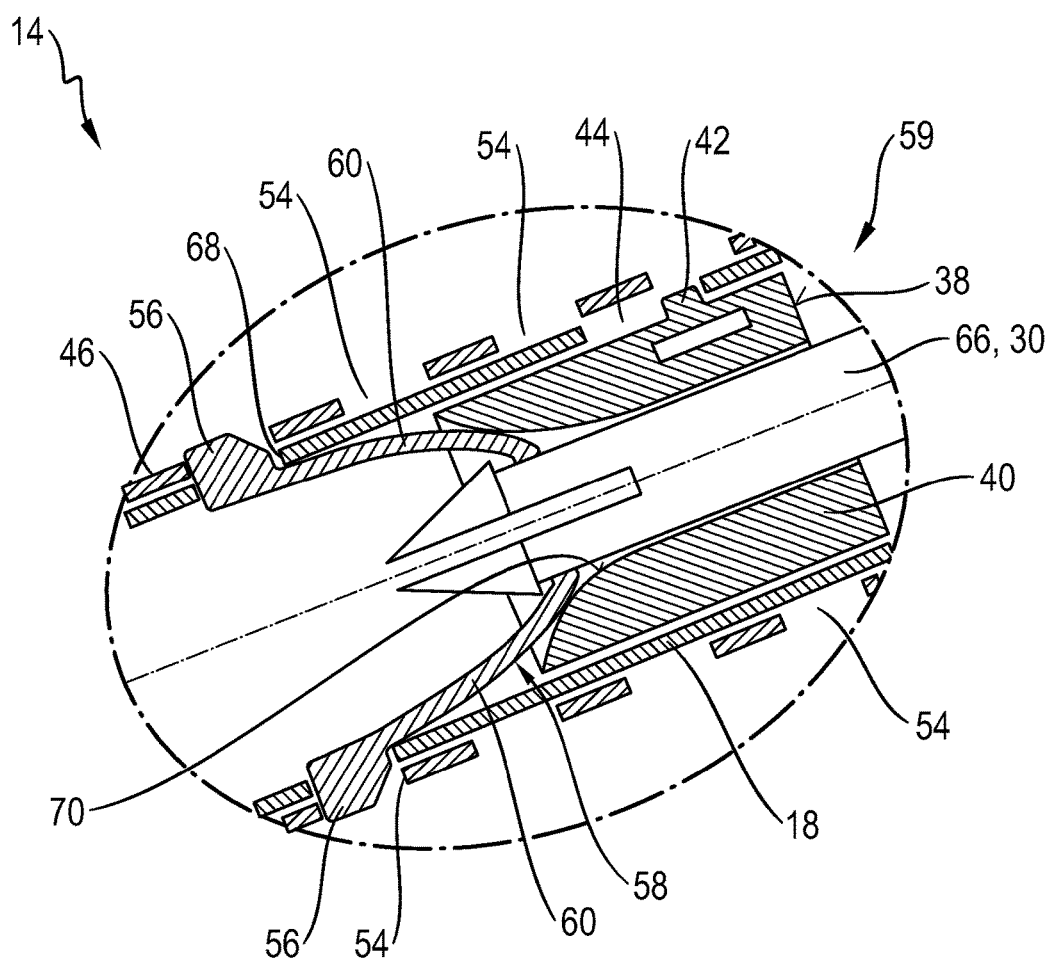
FIG. 3: shows a schematic section through part of a latching mechanism of the head restraint from FIG. 2.

When force is no longer being introduced into the latching mechanism 59 via the actuating bar 24, the return spring 22 moves the actuating bar 24 and the actuating rod 30 back into the original starting position. Moreover, the spring force of the spring arms 60 of the latching element 58 can press the unlocking slide 40 back towards the actuating rod 30, ensuring that the oblique planes 36, 38 remain in contact. The latching nose 56 thereby also is moved radially out. As illustrated in FIG. 3, the latching nose 56 can engage into one of the latching grooves 54 in the latching tube 46 through a partially circumferential aperture 68 in the guide tube 18 and can thereby latch the guide tube 18 to the latching tube 46 in a desired position of the headrest 16 relative to the backrest 12.

What is claimed is:

1. A head restraint for a motor vehicle seat, comprising:
   a headrest for resting on a head;
   at least one guide tube that can be latched to a backrest structure of the motor vehicle seat for movable guidance of the headrest in the direction of travel;
   an actuating rod mounted rotatably in the guide tube;
   an unlocking slide axially moveable in the guide tube between a rest position and an actuating position by rotation of the actuating rod in the guide tube, wherein, in the actuating position, the unlocking slide moves a latching element into an unlatched position, in which the latching element releases latching of the guide tube to the backrest structure, and, in the rest position, the latching element occupies a latched position, in which the latching element latches the guide tube to the backrest structure; and
   an actuating bar, guided in the headrest, for rotating the actuating rod, wherein the actuating bar engages on the headrest via a return spring.

2. A head restraint for a motor vehicle seat, comprising:
   a headrest for resting on a head;
   at least one guide tube that can be latched to a backrest structure of the motor vehicle seat for movable guidance of the headrest in the direction of travel;
   an actuating rod mounted rotatably in the guide tube;
   an unlocking slide axially moveable in the guide tube between a rest position and an actuating position by rotation of the actuating rod in the guide tube, wherein, in the actuating position, the unlocking slide moves a latching element into an unlatched position, in which the latching element releases latching of the guide tube to the backrest structure, and, in the rest position, the latching element occupies a latched position, in which the latching element latches the guide tube to the backrest structure; and
   an actuating bar, guided in the headrest, for rotating the actuating rod, wherein the unlocking slide rests on the actuating rod via an oblique plane extending in a circumferential direction and facing in an axial direction, the unlocking slide being coupled to the guide tube to prevent relative rotation but allows relative axial movement by means of a stud guided in a groove.

3. The head restraint of claim 2, wherein the actuating bar engages on the headrest via a return spring.

4. The head restraint of claim 2, wherein the latching element has a latching nose for blocking a movement of the guide tube relative to the latching tube, the latching nose engaging in the latched position in the guide tube and in a latching tube connected fixedly to the backrest structure.

5. The head restraint of claim 1, further comprising a latching tube that can be connected in a fixed manner to the backrest structure to produce latching to the latching element, the guide tube being guided in the latching tube to prevent relative rotation between the guide tube and the latching tube while allowing relative axial movement between the guide tube and the latching tube.

6. The head restraint of claim 1, wherein the latching element comprises: a latching spring that is elastic in the radial direction, and a spring arm coupled to the actuating rod, wherein, in the actuating position, the unlocking slide presses the spring arm radially in and counter to a spring force of the latching element.

7. A head restraint for a motor vehicle seat, comprising:
a headrest for resting on a head;
at least one guide tube that can be latched to a backrest structure of the motor vehicle seat for movable guidance of the headrest in the direction of travel;
an actuating rod mounted rotatably in the guide tube;
an unlocking slide axially moveable in the guide tube between a rest position and an actuating position by rotation of the actuating rod in the guide tube, the latching element having a latching spring that is elastic in a radial direction, and a spring arm coupled to the actuating rod wherein, in the actuating position, the unlocking slide moves a latching element into an unlatched position, in which the latching element releases latching of the guide tube to the backrest structure, and in which the unlocking slide presses the spring arm radially in and counter to a spring force of the latching element, and wherein in the rest position, the latching element occupies a latched position, in which the latching element latches the guide tube to the backrest structure; and an actuating bar, guided in the headrest, for rotating the actuating rod, wherein the unlocking slide has a contact surface that faces radially in and can be placed against the spring arm, the contact surface defining a funnel shape extending oblique to an axial direction.

8. A head restraint for a motor vehicle seat, comprising:
a headrest for resting on a head;
at least one guide tube that can be latched to a backrest structure of the motor vehicle seat for movable guidance of the headrest in the direction of travel;
an actuating rod mounted rotatably in the guide tube;
an unlocking slide axially moveable in the guide tube between a rest position and an actuating position by rotation of the actuating rod in the guide tube, wherein, in the actuating position, the unlocking slide moves a latching element into an unlatched position, in which the latching element releases latching of the guide tube to the backrest structure, and, in the rest position, the latching element occupies a latched position, in which the latching element latches the guide tube to the backrest structure; and
an actuating bar, guided in the headrest, for rotating the actuating rod, wherein the actuating rod has a retention pin that enters the unlocking slide in an axial direction, the latching element being secured by the retention pin.

9. The head restraint of claim 1, wherein the actuating bar has toothing that meshes with at least one gearwheel secured to the actuating rod for conjoint rotation.

10. The head restraint of claim 1, wherein the actuating bar is connected to a button recessed into the headrest.

11. A motor vehicle seat for a motor vehicle having a backrest, a backrest structure that reinforces the backrest, and the head restraint of claim 1 connected to the backrest structure in a manner that allows adjustment in the direction of travel.

* * * * *